Sept. 4, 1951   E. C. HARTLEY   2,566,885
CYLINDRICAL VALVE
Filed Feb. 18, 1944
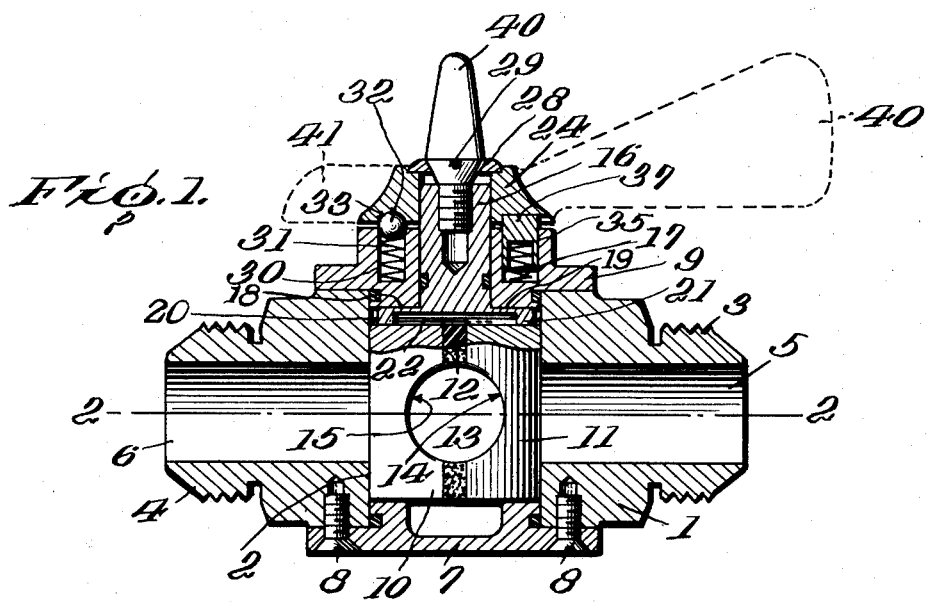
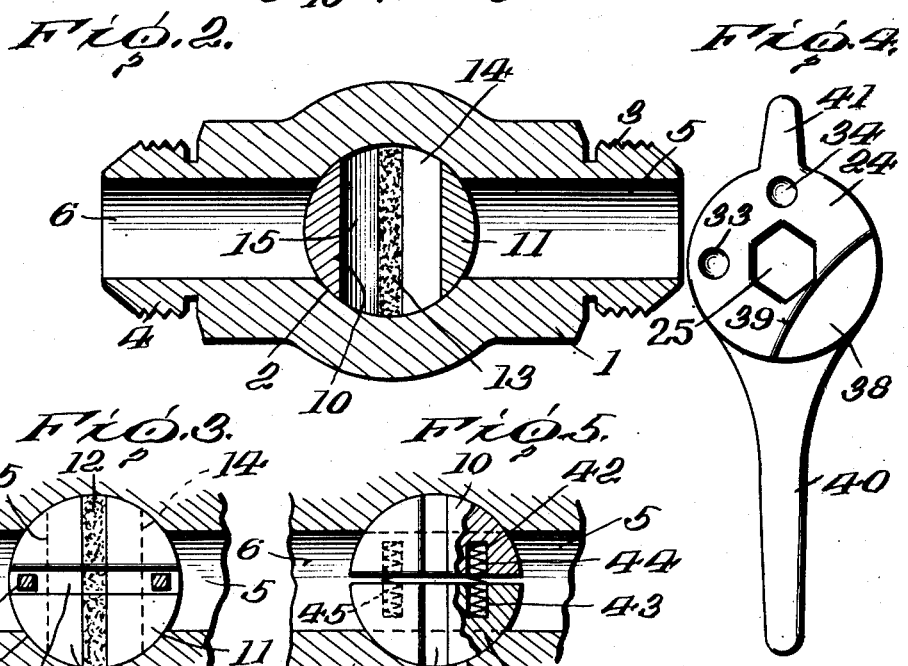
Inventor
Emmett C. Hartley.
By Mason, Porter & Diller
Attorneys Patented Sept. 4, 1951

2,566,885

UNITED STATES PATENT OFFICE 2,566,885

CYLINDRICAL VALVE

Emmett C. Hartley, Cleveland, Ohio, assignor to The Parker Appliance Company, Cleveland, Ohio, a corporation of Ohio Application February 18, 1944, Serial No. 522,894

2 Claims. (Cl. 251—102)

The invention relates to new and useful improvements in a valve assembly of the type wherein the ports of a valve casing are controlled by a valve rotor.

An object of the invention is to provide a valve of the above type wherein the rotor is divided into segments of a cylinder, the outer faces of which conform to and make liquid-tight contact with the cylindrical surface of the chamber within the valve casing, and wherein said segments are pressed into contact with said wall by yielding means disposed between the segments, and wherein said rotor segments are turned by operating lugs engaging said segments adjacent the cylindrical wall of the casing and in a line at right angles to a plane passing between said segments.

A further object of the invention is to provide a valve rotor of the above type wherein the yielding means pressing the segments into contact with the casing seals the space between said segments.

A still further object of the invention is to provide a valve of the above type wherein the stem is turned by a handle member and wherein yielding members carried by the cap in which the stem is mounted operate on said handle member for yieldingly holding the valve rotor in predetermined set positions and for positively limiting the turning movement of the valve rotor.

These and other objects will in part be obvious and will in part be hereinafter more fully described.

In the drawings which show by way of illustration one embodiment of the invention.

Figure 1 is a vertical sectional view through a valve assembly embodying the improvements.

Figure 2 is a sectional view through the valve casing on the line 2—2 of Figure 1 showing the valve rotor in "off" position.

Figure 3 is a view showing more or less diagrammatically the connection of the lugs to the valve rotor for the turning of the same.

Figure 4 is a bottom plan view of the handle detached from the valve stem.

Figure 5 is a view similar to Figure 3 but showing a modified form of means for pressing the rotor segments into contact with the valve casing.

The improved valve assembly includes a valve casing 1 which is provided with a cylindrical chamber 2 which extends all the way through the valve casing. The valve casing is provided with threaded extensions 3 and 4 respectively. The extension 3 is provided with a port 5 leading to the valve chamber and the extension 4 is provided with a port 6 leading to the valve chamber. The casing and extension are of the usual construction and will not be described in detail. The cylindrical chamber 2 extends all the way through the valve casing from the lower side thereof to the upper side as viewed in Figure 1. The lower end of this valve chamber is closed by a closure plate 7 which is secured to the valve casing by suitable screws. There are also screws passing through this closure plate into the casing, which screws are indicated at 8, 8. The upper side of the cylindrical chamber is closed by a cap 9 which is secured to the casing in any well known way.

Mounted in the valve chamber is a valve rotor which is formed of two segments of a cylinder. One of the segments is indicated at 10 and the other at 11. The outer face of each segment is cylindrical and said cylindrical surface of the segments conforms to the cylindrical surface of the chamber 2 in the valve casing. The segments are spaced from each other and disposed in the space between the segments are rubber slugs 12 and 13. The rotor segment 11 is provided with a recess 14 and the rotor segment 10 is provided with a recess 15. These recesses 14 and 15 form the passage through the rotor which is moved by the turning of the rotor into and out of alignment with the ports 5 and 6.

These rubber slugs placed between the segments are dimensioned so that they are tensioned when the rotors are placed in the cylindrical chamber so as to force said segments into fluid-tight contact with the walls of the chamber. These rubber slugs extend all the way from one end of the passage through the rotor to the other end thereof, so that when said passage in the rotor is brought into alignment with the ports 5 and 6 the slugs serve as a liquid seal to prevent the liquid from passing in between the segments and depositing gravel and the like therebetween which will interfere with their operation. There are the usual seals between the bottom plate 7 and the casing and also between the cap and the casing.

The driver 16 for the rotor is in the form of a stem, said stem extending through the cap 9 and is mounted for free rotation therein. A gasket 17 forms a seal between the stem and the cap. This stem 16 passes all the way through the cap and carries at its inner end radially projecting arms 18 and 19. The arm 18 is provided with a lug 20 and the arm 19 is provided with a lug 21. The rotor segment 10 is provided with a groove or recess 22 and the rotor segment 11 has a similar groove or recess 23. These grooves 22 and 23 are in alignment and they extend diametrically across the rotor in a direction at right angles to a plane passing between the segments of the rotor. The lugs 20 and 21 extend down into these grooves. The grooves are substantially rectangular in transverse section and so are the lugs, so that the lugs contact with the walls of the recesses or grooves for turning the rotor segments with little lost motion. The segments, however, are free to move radially of the cylindrical chamber so far as the connection of the lugs is concerned. These lugs are disposed adjacent the walls of the cylindrical chamber and therefore the turning force of the lugs is applied at the outer extremity of each rotor segment and substantially in a direction parallel with the adjacent inner faces of the segments. This reduces the pressure of the lugs necessary to turn the rotor segments and minimizes the tendency of the edges of said segments to dig into the wall of the casing during rotation.

Attached to the stem 16 is a turning handle which is provided with a base 24 having an irregular opening 25 therethrough which engages a similar irregular shaping of the end of the valve stem 16. This attaches the handle to the valve stem so that any turning movement of the handle will be imparted to the stem. The handle is secured to the valve stem by means of a cap plate 28 and a holding screw 29 which is threaded onto the stem. This base 24 is substantially the same dimension as the upper end of the cap 9. The cap 9 is provided with a recess 30 which extends in a direction parallel with the stem. Mounted in the recess is a spring 31 which engages a ball 32 and yieldingly forces the ball into contact with the underface of the base 24. Said underface of the base member is provided with two spaced recesses 33 and 34. These recesses are disposed so that when the ball engages one of the recesses the valve rotor will be positioned so that the passage therethrough is in alignment with the ports 5 and 6 and, when the ball engages the other recess, then the passage through the rotor will be disposed substantially midway between the ports and the ports will be closed. This ball and the recess with which it cooperates positions the valve rotor in "on" and "off" positions.

The cap 9 is provided with a recess 35 which is located diametrically opposite the recess 30. In this recess 35 is a spring 36 and a sleeve carrying a stop lug 37. The underface of the handle is cut away at 38 so as to form a shoulder 39. The stop lug is yieldingly pressed in contact with the base of the handle in the region of the recess 38 and when the handle is turned in one direction this stop lug will contact with the shoulder and limit any further movement thereof. Likewise when it is turned in the opposite direction the stop lug will contact again with the shoulder at another point and prevent any further turning movement of the valve rotor.

The spring-pressed ball and the spring-pressed stop lug as noted are located diametrically opposite each other relative to the axis on which the stem turns. These members are spring-pressed in a direction substantially parallel with the axis of the stem. Therefore the pressure on the handle member exerts solely a force tending to move the stem longitudinally and all cocking or twisting strains are avoided.

The handle has a laterally projecting portion 40 which may be grasped by the hand for the turning of the valve and it also has an extension 41 which serves as an indicator cooperating with suitable indicating marks on the cap of the valve casing so as to visibly indicate whether the valve is in "on" or "off" position.

In the modified form shown in Figure 5, the rotor segments and the means for turning said segments are the same as described in connection with Figure 1. The means for yieldingly pressing the segments into liquid-tight contact with the valve casing has been changed slightly. Instead of the rubber slugs there are recesses 42 and 43 formed in the segments 10 and 11 and a spring 44 is disposed in the recess and exerts a pressure which tends to separate the segments. There are preferably four of these springs similarly mounted and another one is indicated at 45 in Figure 5. These springs tend to separate the segments and force the segments into liquid-tight contact with the inner cylindrical surface of the valve casing.

While the valve casing has been shown as having two ports and the rotor a single port for directly connecting the same, it will be understood that with a slight modification of the passage through the rotor, additional ports may be provided in the valve casing and said ports interconnected or closed by the turning of the valve rotor. For a two-way connection, the arrangement of the ports described above is preferred as it provides a direct through connection from one port to another with little pressure loss.

It is obvious that many changes in the details of construction can be made without departing from the spirit of the invention as set forth in the appended claims.

I claim:

1. A valve assembly comprising a valve casing having a cylindrical chamber, a valve rotor in said chamber, said rotor consisting of two segments of a cylinder, the outer faces of which conform to the cylindrical surface of the valve casing and the inner faces of which are spaced and substantially parallel with each other, rubber slugs disposed in the space between the segments and filling the same, said rubber slugs being tensioned so as to press said segments of the rotor into fluid-tight contact with the wall of the valve casing, a closure cap for said casing, a valve stem extending through said cap, a crosshead carried by said stem within said chamber, said rotor segments having aligned grooves disposed diametrically of the rotor and at right angles to the inner faces of said segments, said crosshead having depending lugs at the outer ends thereof engaging said grooves adjacent the wall of the casing for turning said rotor.

2. A valve assembly comprising a valve casing having a cylindrical chamber, a valve rotor in said chamber consisting of two segments of a cylinder, the outer faces of which conform to the cylindrical surface of said chamber and the inner faces of which are spaced and substantially parallel with each other, said segments being of equal length, each segment having a segmental recess extending across the inner face thereof and forming a passage adapted to be moved into and out of alignment with ports in the valve casing, yielding means disposed between the segments and operating to press said segments of the rotor into fluid tight contact with the cylindrical wall of the chamber, a closure cap for the upper end of said cylindrical chamber, said cap having a central opening therethrough, a valve operating stem extending through said cap opening and having laterally projecting portions at the lower end thereof bearing against the inner face of the cap, the end portions of the segments of the rotor adjacent the laterally projecting portions of the stem having aligned grooves disposed diametrically of the rotor and at right angles to the inner faces of the segments, said projecting portions of the stem having means for engaging said grooves in both segments for turning said segments, said rotor segments being free to move radially of the rotor on said turning means in a direction at right angles to the inner faces of said rotor segments, said turning means on the stem projecting portions also serving as a guide to prevent angular shifting of one rotor segment with respect to the other when the segments are pressed into contact with the cylindrical wall of said chamber by said yielding means.

EMMETT C. HARTLEY.

REFERENCES CITED

The following references are of record in the file of this patent:

UNITED STATES PATENTS

| Number | Name | Date |
| --- | --- | --- |
| 21,366 | Robinson | Aug. 31, 1858 |
| 1,024,884 | Fitts | Apr. 30, 1912 |
| 1,183,012 | Kunzer | May 16, 1916 |
| 1,578,383 | Bayles | Mar. 30, 1926 |
| 1,760,951 | Manifold | June 3, 1930 |
| 1,840,498 | Froussard | Jan. 12, 1932 |
| 1,949,191 | Smolensky | Feb. 27, 1934 |
| 2,060,256 | Smith | Nov. 10, 1935 |
| 2,274,731 | Parker | Mar. 3, 1942 |
| 2,282,455 | Church | May 12, 1942 |
| 2,336,027 | Milliken | Dec. 7, 1943 |

FOREIGN PATENTS

| Number | Country | Date |
| --- | --- | --- |
| 192,433 | Germany | Dec. 12, 1907 |
| 698,065 | France | Nov. 17, 1930 |